US008738069B2

(12) United States Patent
Yamamoto

(10) Patent No.: US 8,738,069 B2
(45) Date of Patent: May 27, 2014

(54) MOBILE COMMUNICATION DEVICE, COMMUNICATION SYSTEM, COMMUNICATION CONTROL METHOD AND COMMUNICATION CONTROL PROGRAM

(75) Inventor: Takeshi Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 336 days.

(21) Appl. No.: 13/254,302

(22) PCT Filed: Mar. 2, 2010

(86) PCT No.: PCT/JP2010/053726
§ 371 (c)(1),
(2), (4) Date: Sep. 1, 2011

(87) PCT Pub. No.: WO2010/101271
PCT Pub. Date: Sep. 10, 2010

(65) Prior Publication Data
US 2011/0319127 A1    Dec. 29, 2011

(30) Foreign Application Priority Data
Mar. 4, 2009    (JP) ................................. 2009-050017

(51) Int. Cl.
H04B 7/185    (2006.01)
(52) U.S. Cl.
USPC ........................................ 455/522; 370/318
(58) Field of Classification Search
CPC ............ H04B 7/26; H04B 7/185; H04B 1/04; G08G 1/09; H04W 52/04; H04W 52/12; H04W 52/24; H04W 52/40; H04W 52/50
USPC .......................................... 455/522; 370/318
See application file for complete search history.

(56) References Cited

U.S. PATENT DOCUMENTS

| 6,836,666 B2 * | 12/2004 | Gopalakrishnan et al. ............... 455/452.2 |
| 8,208,951 B2 * | 6/2012 | Yamamoto ..................... 455/522 |
| 2005/0070287 A1 * | 3/2005 | Cave et al. ..................... 455/436 |

(Continued)

FOREIGN PATENT DOCUMENTS

| JP | 2007-281804 A | 10/2007 |
| JP | 2008118580 A | 5/2008 |

(Continued)

OTHER PUBLICATIONS

International Search Report for PCT/JP2010/053726 mailed Jun. 8, 2010.
Japanese Office Action for JP 2009-050017 mailed on Jan. 8, 2013.

Primary Examiner — Bobbak Safaipour
(74) Attorney, Agent, or Firm — Sughrue Mion, PLLC

(57) ABSTRACT

Provided is a communication device which transmits a signal by setting appropriate transmission power under the situation that the communication device moves.
The mobile communication device includes transmitting and receiving means for receiving a first signal transmitted from other mobile communication device; control means for holding first circumference information including transmission power setting information of the first signal, time information including receiving time when the transmitting and receiving means receives the first signal, and receiving power information of the first signal in the transmitting and receiving means, and deleting the first circumference information in a case where a predetermined period has passed from the receiving time; and transmission power control means for generating transmission power setting information of a second signal and outputting to the transmitting and receiving means, and providing a predetermined value to the transmission power setting information of the second signal in a case where the first circumference information is deleted.

20 Claims, 9 Drawing Sheets

(56) References Cited

U.S. PATENT DOCUMENTS

2005/0119022 A1* 6/2005 Suzuka et al. ............... 455/522
2005/0148347 A1* 7/2005 Nagai ...................... 455/456.6

FOREIGN PATENT DOCUMENTS

| | | |
|---|---|---|
| JP | 2008227797 A | 9/2008 |
| JP | 2008244960 A | 10/2008 |

* cited by examiner

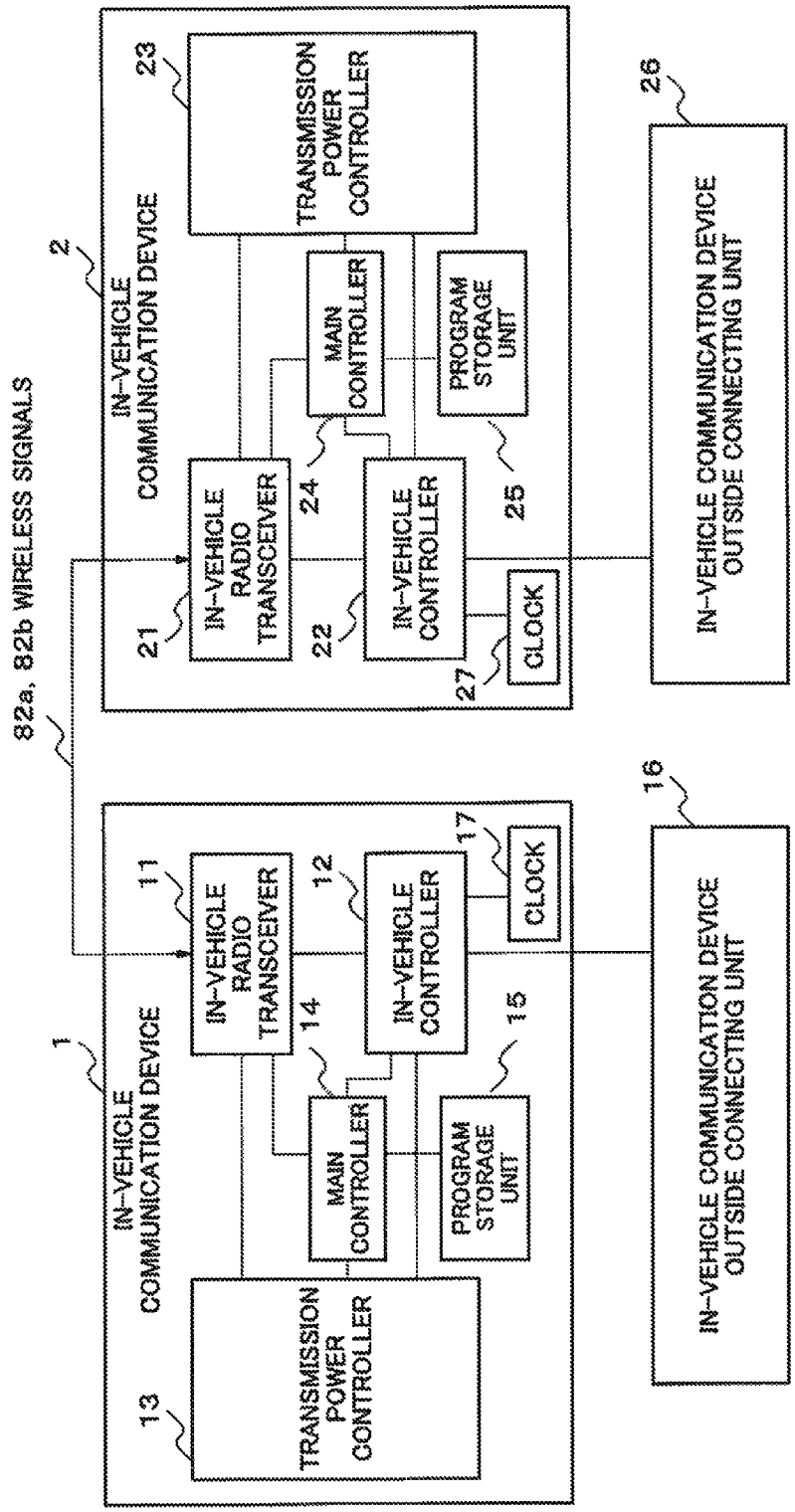

Fig.4

CIRCUMFERENCE VEHICLE INFORMATION

| IN-VEHICLE COMMUNICATION DEVICE WHICH CAN COMMUNICATE DIRECTLY | LOCATION INFORMATION | TRANSMISSION POWER SETTING VALUE | RECEIVING POWER | LOCATION INFORMATION RECEIVING TIME |
|---|---|---|---|---|
| 1 (OWN IN-VEHICLE DEVICE) | Position 0 (OWN IN-VEHICLE DEVICE) | TXP0 | — | T0 (OWN IN-VEHICLE DEVICE) |
| 2 | Position 1 | TXP1 | RSS1 | T1 |
| 3 | Position 2 | TXP2 | RSS2 | T2 |
| 4 | Position 3 | TXP3 | RSS3 | T3 |
| 5 | Position 4 (EXPIRATION OF VALIDITY PERIOD) | (TXP4) (EXPIRATION OF VALIDITY PERIOD) | (RSS4) (EXPIRATION OF VALIDITY PERIOD) | (T4) (EXPIRATION OF VALIDITY PERIOD) |

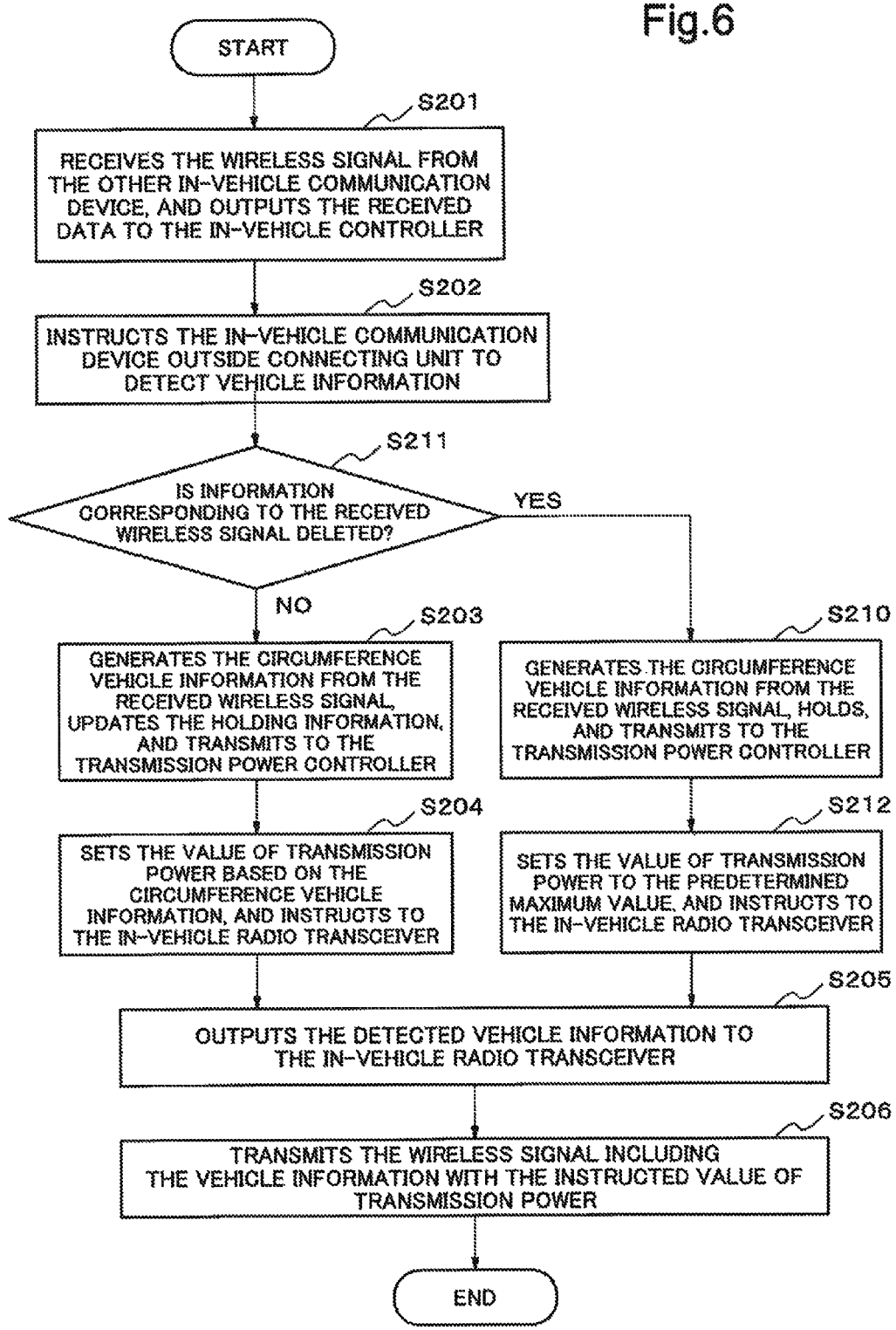

Fig.7

| TRANSMISSION POWER SETTING OF THE IN-VEHICLE COMMUNICATION DEVICE 1 | | | | |
|---|---|---|---|---|
| THE RECEIVING POWER OF THE WIRELESS SIGNAL FROM THE IN-VEHICLE COMMUNICATION DEVICE 2 IN THE IN-VEHICLE COMMUNICATION DEVICE 1 / TRANSMISSION POWER SETTING OF THE IN-VEHICLE COMMUNICATION DEVICE 2 | STRONG | MEDIUM | STRONG | WEAK |
| STRONG | MEDIUM | STRONG | STRONG | STRONG |
| MEDIUM | WEAK | MEDIUM | STRONG | STRONG |
| WEAK | WEAK | WEAK | MEDIUM | MEDIUM |

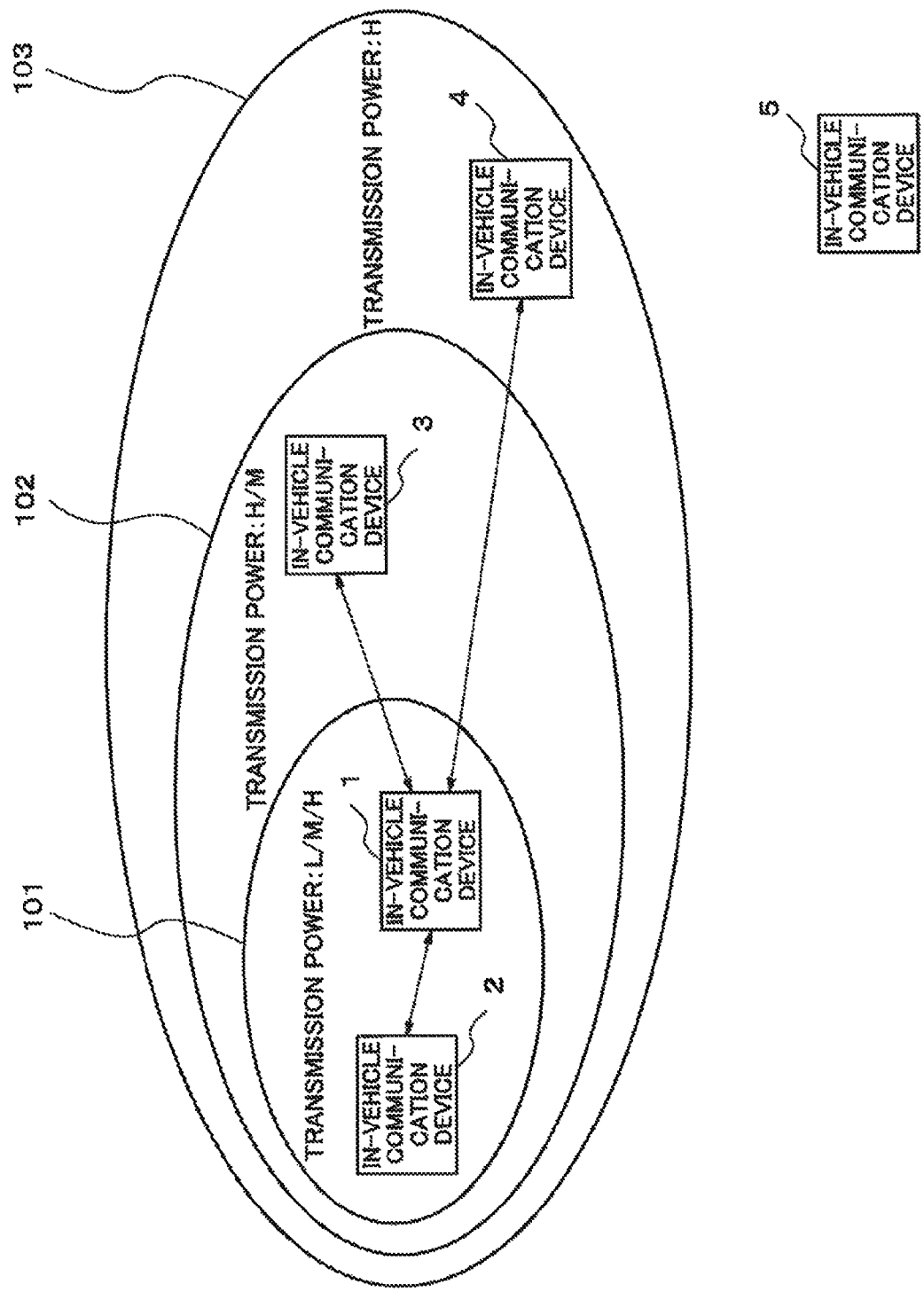

MOBILE COMMUNICATION DEVICE, COMMUNICATION SYSTEM, COMMUNICATION CONTROL METHOD AND COMMUNICATION CONTROL PROGRAM

TECHNICAL FIELD

The present invention relates to a mobile communication device, a communication system, a communication control method and a communication control program, and particularly relates to a mobile communication device, a communication system, a communication control method and a communication control program, which perform communication between the mobile communication devices without passing through a base station.

BACKGROUND ART

A communication system, which performs communication between mobile communication devices without passing through a base station, such as communication between the cars, is known. In this communication system, when the communication device moves, a communication partner may leave from a communication area or a number of communication partners may decrease. Also, in an area where a plurality of communication devices concentrate, the number of partners of communication within the communication area may become very large. Moreover, these situations temporally fluctuate. In particular, in the area where the communication devices are concentrated, wireless communication is crowded and congestion of communication occurs, and a throughput declines.

Patent document 1 discloses a wireless communication device and a transmission power control method for selecting one among respective pieces of ID information of a plurality of in-vehicle communication devices received from a plurality of surrounding in-vehicle communication devices, acquiring a transmission power setting value and a receiving power measured value corresponding to the ID information, and determining a transmission power setting value for the next time with reference to a predetermined table. Data on the table may be deleted if there is no update for a scheduled time. In this related art, a communication possible area is adjusted by control of the transmission power. That is, the number of communication devices within the communication area is limited. As a result, a radio link with a surrounding communication device is secured. Also, the occurrence of congestion of communication is suppressed, and the decline in the throughput is reduced.

Patent document 2 discloses a communication terminal and a data communication method for determining a transmission condition of the transmission radio wave transmitted to other communication terminals based on running environment information at a current spot of a vehicle and on running speed information representing running speed of the vehicle. Further, the communication terminal disclosed in the patent document 2 transmits the running environment information and the running speed information to a fixedly installed information processing apparatus, and makes the information processing apparatus determine the transmission condition of the transmission radio wave transmitted to other communication terminals.

CITATION LIST

Patent Literature

[Patent document 1] Japanese Patent Application Publication No. 2008-244960
[Patent document 2] Japanese Patent Application Publication No. 2008-227797

SUMMARY OF INVENTION

Technical Problem

However, the wireless communication device and the transmission power control method disclosed in the patent document 1 do not respond to the temporal change of situations by movement of the communication device. That is, they do not set an appropriate transmission power in response to the temporal change of the communication partner. Further, data on the table is deleted if there is no update for the scheduled time, however, they do not respond to the situation of the in-vehicle communication device of the communication partner that temporally changes after the deletion of the data.

The patent document 2 only determines the transmission condition of the transmission radio wave based on the running environment and on the running speed of the vehicle which is equipped with a terminal for transmitting the transmission radio wave, but does not determine the transmission condition of the transmission radio wave according to the situation of the communication terminal of the communication partner.

The object of the present invention is to provide a mobile communication device, a communication system, a communication control method and a communication control program, which solve the problem mentioned above.

Solution to Problem

In order to solve the problem mentioned above, a mobile communication device according to the present invention is characterized by including: transmitting and receiving means for receiving a first signal transmitted from other mobile communication device; control means for holding first circumference information including transmission power setting information of the first signal, time information including receiving time when the transmitting and receiving means receives the first signal, and receiving power information of the first signal at the transmitting and receiving means, and deleting the first circumference information in a case where a predetermined period has passed from the receiving time; and transmission power control means for generating transmission power setting information of a second signal and outputting to the transmitting and receiving means, and providing a predetermined value to the transmission power setting information of the second signal in a case where the first circumference information is deleted.

In order to solve the problem mentioned above, a communication system according to the present invention includes first and second communication devices, wherein each of the first and second communication devices comprises: transmitting and receiving means for receiving a first signal transmitted from other mobile communication device; control means for holding first circumference information including transmission power setting information of the first signal, time information including receiving time when the transmitting and receiving means receives the first signal, and receiving power information of the first signal at the transmitting and receiving means, and deleting the first circumference information in a case where a predetermined period has passed from the receiving time; and transmission power control means for generating transmission power setting information of a second signal and outputting to the transmitting and receiving means, and providing a predetermined value to the transmission power setting information of the second signal in a case where the first circumference information is deleted.

In order to solve the problem mentioned above, a communication control method according to the present invention is characterized by including: a receiving step for receiving a first signal transmitted from other mobile communication device; a circumference information control step for holding first circumference information including transmission power setting information of the first signal, time information including receiving time when the first signal is received, and receiving power information of the first signal, and deleting the first circumference information in a case where a predetermined period has passed from the receiving time; a transmission power setting step for generating transmission power setting information of a second signal, and providing a predetermined value to the transmission power setting information of the second signal in a case where the first circumference information is deleted; and a transmission step for transmitting the second signal with transmission power based on the transmission power setting information.

In order to solve the problem mentioned above, a communication control program according to the present invention for causing a computer to execute a control process is characterized by including: a receiving step for receiving a first signal transmitted from other mobile communication device; a circumference information control step for holding first circumference information including transmission power setting information of the first signal, time information including receiving time when the first signal is received, and receiving power information of the first signal, and deleting the first circumference information in a case where a predetermined period has passed from the receiving time; a transmission power setting step for generating transmission power setting information of a second signal, and providing a predetermined value to the transmission power setting information of the second signal in a case where the first circumference information is deleted; and a transmission step for transmitting the second signal with transmission power based on the transmission power setting information.

Advantageous Effects of Invention

According to the present invention, in a situation where the communication device moves, a transmission power of wireless signals transmitted between communication devices is set to an appropriate value.

BRIEF DESCRIPTION OF DRAWINGS

FIG. 3 shows an example of a configuration of a communication system according to an exemplary embodiment 2 of the present invention.

FIG. 4 shows an example of a configuration of circumference vehicle information according to the exemplary embodiment 2 of the present invention.

FIG. 6 shows an example of a setting procedure of transmission power in the mobile communication device according to the exemplary embodiment 2 of the present invention.

FIG. 7 shows an example of a correspondence relationship between transmission power setting value and receiving power of a wireless signal in the communication system according to the exemplary embodiment 2 of the present invention.

FIG. 9 shows an example of a configuration of a communication system according to an exemplary embodiment 4 of the present invention.

DESCRIPTION OF EMBODIMENTS

Hereinafter, exemplary embodiments of the present invention will be described in detail with reference to the drawings.

First Embodiment

Figure 1:
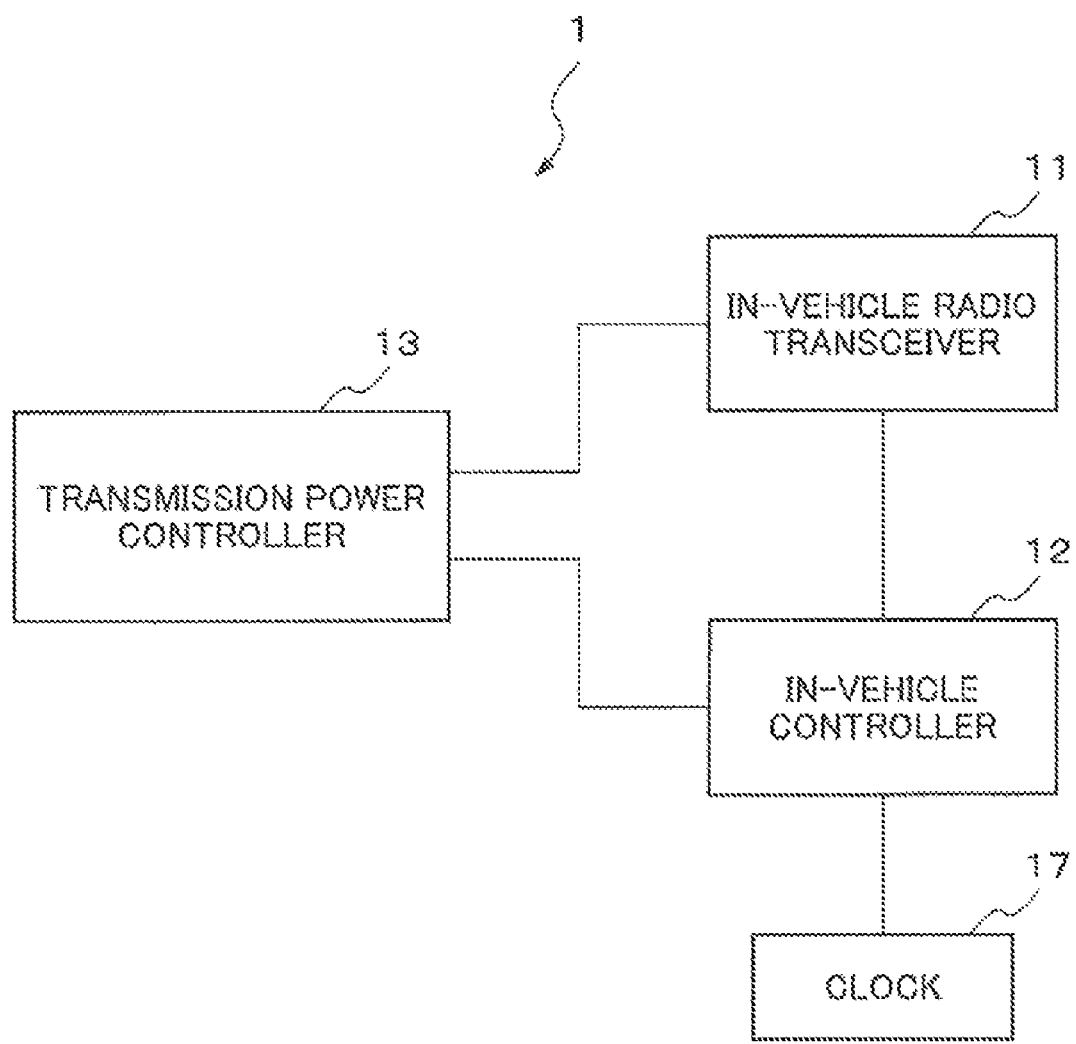
FIG. 1 shows an example of a configuration of a mobile communication device according to an exemplary embodiment 1 of the present invention.

FIG. 1 shows an example of a configuration of a mobile communication device according to the first exemplary embodiment of the present invention. In FIG. 1, the mobile communication device 1 includes an in-vehicle radio transceiver 11, an in-vehicle controller 12 which is connected to the in-vehicle radio transceiver 11, a transmission power controller 13 which is connected to the in-vehicle radio transceiver 11 and the in-vehicle controller 12, and a clock 17 which is connected to the in-vehicle radio transceiver 11. Further, the clock 17 may be included in the in-vehicle radio transceiver 11. Also, the clock 17 may be a clock provided in the mobile communication device 1.

The in-vehicle radio transceiver 11 directly communicates with other mobile communication devices. That is, it transmits a wireless signal including transmission power setting information of the mobile communication device 1 with the set transmission power. Further, the in-vehicle radio transceiver 11 receives the wireless signal including the transmission power setting information transmitted from the other mobile communication device.

Figure 2:
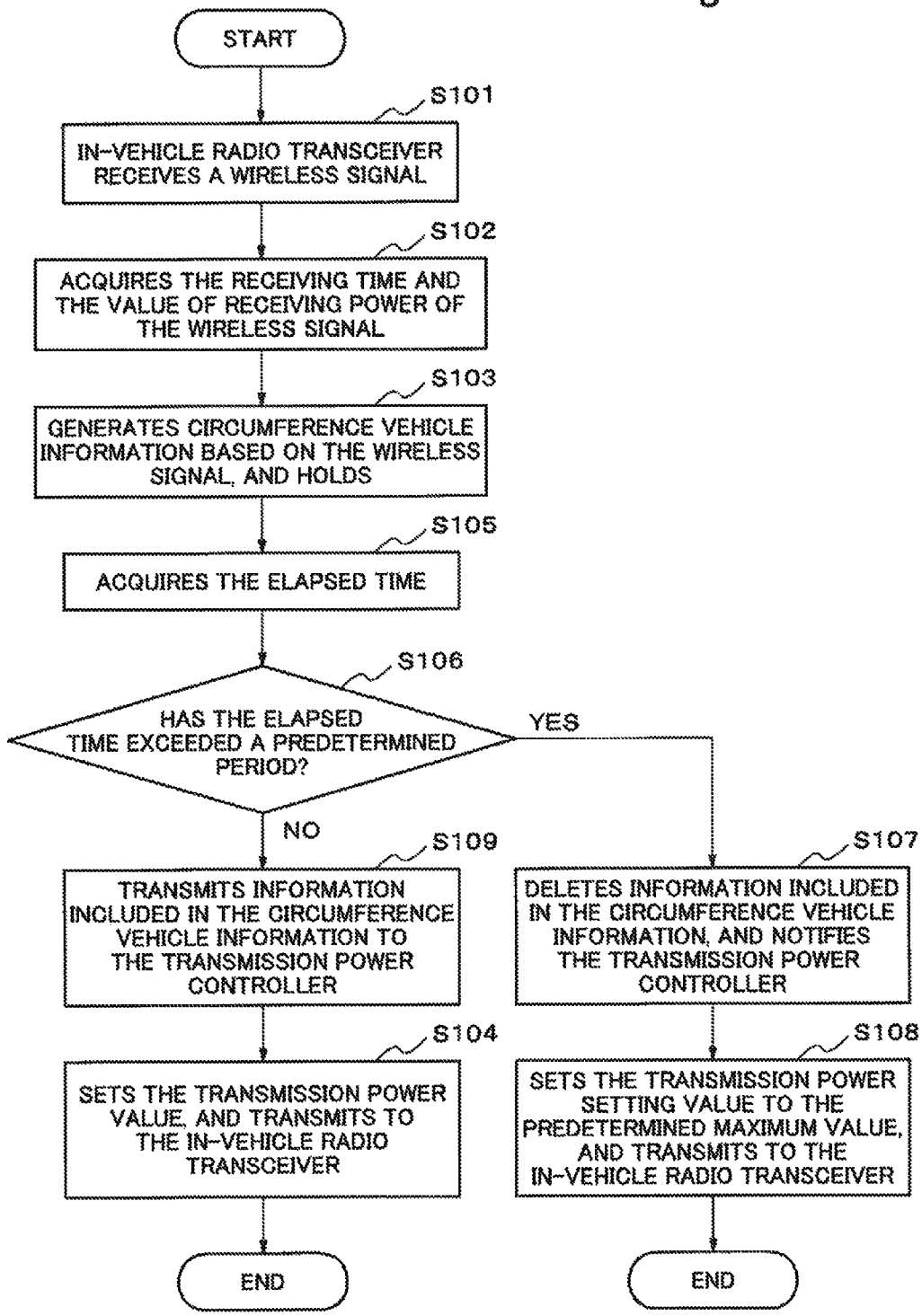
FIG. 2 shows an example of a setting procedure of transmission power in the mobile communication device according to the exemplary embodiment 1 of the present invention.

FIG. 2 shows an example of a procedure of a setting method of transmission power in the mobile communication device according to the first exemplary embodiment of the present invention. The process for setting the transmission power of the wireless signal transmitted from the mobile communication device 1 will be described with reference to FIGS. 1 and 2.

The in-vehicle controller 12 receives, from the in-vehicle radio transceiver 11, the transmission power setting information of the other mobile communication device included in the wireless signal which is received by the in-vehicle radio transceiver 11 (Step S101). Also, the in-vehicle controller 12 acquires, from the clock 17, a time on which the in-vehicle radio transceiver 11 receives the wireless signal. Further, the in-vehicle controller 12 acquires a value of receiving power of the wireless signal (Step S102). Circumference vehicle information, in which the transmission power setting information, the receiving time and the receiving power are correlated with each other, is generated, and the circumference vehicle information is held in the in-vehicle controller 12 (Step S103). Further, the circumference in-vehicle information may be held in an information holding means (not shown) which is connected to the in-vehicle controller 12.

The transmission power controller 13 receives the circumference vehicle information from the in-vehicle controller 12, and sets a value of transmission power of the wireless signal transmitted from the in-vehicle radio transceiver 11 based on the circumference vehicle information. The transmission power controller 13 outputs the set value to the in-vehicle radio transceiver 11 (Step S104). The in-vehicle controller 12 refers to the clock 17, and acquires elapsed time from the receiving time included in the held circumference vehicle information and the current time (Step S105). The in-vehicle controller 12 deletes the information included in the circumference vehicle information in a case where the elapsed time is judged to have exceeded a predetermined period (step S106: YES). The in-vehicle controller 12 transmits a notification that the information included in the circumference vehicle information has been deleted to the transmission power controller 13 (Step S107). When receiving this notification, the transmission power controller 13 sets the value of transmission power to a predetermined value of maximum, and transmits the maximum value to the in-vehicle radio transceiver 11 (Step S108). Further, in a case where the elapsed time has not exceeded the predetermined period (step S106: NO), it transmits the circumference vehicle information to the transmission power controller 13 (Step S109), and the process ends.

It becomes possible to set to an appropriate transmission power, even if it is in the situation where each mobile communication device moves.

Further, the wireless signal may include location information such as moving speed, moving direction or a position of the other mobile communication device, and the circumference in-vehicle information may include the location information. As a result, more detailed information on the communication partner is acquired. For example, the communication partner is equipped in a vehicle in congestion, and it is judged whether there exist a large number of other communication partners circumferentially. It is also judged whether the communication partner is moving away from the congested area or whether it still remains the congested state.

Second Embodiment

Next, the second exemplary embodiment of the present invention will be described in detail with reference to drawings. FIG. 3 shows an example of a configuration of a communication system according to the second exemplary embodiment of the present invention. As a communication system of the mobile communication device for the present invention, FIG. 3 shows a communication system between cars and shows an in-vehicle communication device as the mobile communication device. Further, the present invention is not limited to the communication system between the cars and the in-vehicle communication device.

FIG. 3 shows two mobile communication devices (hereinafter, indicated as "in-vehicle communication device") 1 and 2. The configuration of the in-vehicle communication device 1 is the same as the in-vehicle communication device 2. Accordingly, here, only the configuration of the in-vehicle communication device 1 is described, and a description of the configuration of the in-vehicle communication device 2 is omitted. The present invention is not limited to two in-vehicle communication devices and is also applied to a communication system provided with more than three in-vehicle communication devices.

The configuration of the in-vehicle communication device 1 according to the second exemplary embodiment is almost the same as the configuration of the in-vehicle communication device according to the first exemplary embodiment. That is, the in-vehicle communication device 1 includes the in-vehicle radio transceiver 11, the in-vehicle controller 12, the transmission power controller 13 and the clock 17. The clock 17 may be included in the in-vehicle radio transceiver 11. The clock 17 may be a clock provided in the in-vehicle communication device 1. The in-vehicle communication device 1 according to the second exemplary embodiment further includes a main controller 14 which is connected to the in-vehicle radio transceiver 11, the in-vehicle controller 12 and the transmission power controller 13, and a program storage part 15 which is connected to the main controller 14. An in-vehicle communication device outside connecting part 16 which is connected to the in-vehicle controller 12 is provided outside the in-vehicle communication device 1.

The in-vehicle radio transceiver 11 communicates with other in-vehicle communication devices directly. That is, the in-vehicle radio transceiver 11 transmits a wireless signal including location information and transmission power setting information of the in-vehicle communication device 1 with the transmission power of the set value. The in-vehicle radio transceiver 11 receives the wireless signal including the location information and the transmission power setting information transmitted from the other in-vehicle communication device 2 or the like. The in-vehicle radio transceiver 11 may receive wireless signals transmitted from a plurality of other in-vehicle communication devices.

The in-vehicle controller 12 controls data flows in the in-vehicle communication device 1, the input of data to the in-vehicle communication device 1 and the output of data from the in-vehicle communication device 1. The in-vehicle controller 12 receives, from the in-vehicle radio transceiver 11, location information such as moving speed, moving method or a position, and transmission power setting information of the other in-vehicle communication device 2 or the like, included in the wireless signal which the in-vehicle radio transceiver 11 has received. Also, from the clock 17, the in-vehicle controller 12 acquires a time when the in-vehicle radio transceiver 11 received the wireless signal. Further, the in-vehicle controller 12 acquires a value of receiving power of the wireless signal. The location information, the transmission power setting information, the receiving time and the receiving power are correlated with each other and held in the in-vehicle controller 12 as circumference vehicle information. Further, the circumference in-vehicle information may be held by an information holding means (not shown) which is connected to the in-vehicle controller 12. Further, the in-vehicle controller 12 outputs, to the transmission power controller 13, the circumference vehicle information including the location information, the transmission power setting value, the receiving power and the receiving time received from a surrounding vehicle.

The transmission power controller 13 receives the circumference vehicle information from the in-vehicle controller 12, and, based on the circumference vehicle information, sets the value of transmission power of the wireless signal which is transmitted from the in-vehicle radio transceiver 11. The transmission power controller 13 outputs the set value to the in-vehicle radio transceiver 11. The in-vehicle controller 12 refers to the clock 17 and acquires elapsed time from the receiving time, which is included in the held circumference vehicle information, and the current time. The in-vehicle controller 12 deletes the information included in the circumference vehicle information in a case where the elapsed time is judged to have exceeded a predetermined period. The in-vehicle controller 12 transmits a notification that the information included in the circumference vehicle information has been deleted to the transmission power controller. When receiving this notification, the transmission power controller 13 sets the value of transmission power to the predetermined value of maximum, and transmits the maximum value to the in-vehicle radio transceiver 11.

The main controller 14 controls the in-vehicle radio transceiver 11, the in-vehicle controller 12 and the transmission power controller 13. The program storage part 15 stores a program of the communication control method which will be described later.

The in-vehicle communication device outside connecting part 16 includes an in-vehicle application system and detects moving information of an in-vehicle communication device. For example, the in-vehicle communication device outside connecting part 16 includes GPS (Global Positioning System) or an in-vehicle sensor. GPS acquires a position of the in-vehicle communication device 1. The in-vehicle sensor measures at least one of a moving direction and a magnitude of the speed of the in-vehicle communication device 1. The acquired position, moving direction or moving speed of the in-vehicle communication device 1 is transmitted as location information of the in-vehicle communication device 1.

Wireless signals 82a and 82b are exchanged between the in-vehicle communication device 1 and the in-vehicle communication device 2. That is, the wireless signal 82a is transmitted to the in-vehicle radio transceiver 21 of the in-vehicle communication device 2 from the in-vehicle radio transceiver 11 of the in-vehicle communication device 1, and the wireless signal 82b is transmitted to the in-vehicle radio transceiver 11 of the in-vehicle communication device 1 from the in-vehicle radio transceiver 21 of the in-vehicle communication device 2.

Next, the circumference vehicle information will be described. FIG. 4 shows an example of a configuration of the circumference vehicle information in the in-vehicle communication device according to the second exemplary embodiment of the present invention. FIG. 4 shows an example of the circumference vehicle information in the communication system including five vehicles including a vehicle in which the in-vehicle communication device 1 is equipped. Further, the number of vehicles included in the communication system is not limited to 5. The circumference vehicle information shown in FIG. 4 includes a field in which an identification code (2 to 5) of the in-vehicle communication device which can directly communicate with the in-vehicle communication device 1 is written, a field in which the location information of the in-vehicle communication device is written, a field in which the transmission power setting value set by the in-vehicle communication device is written, a field in which the value of receiving power when receiving a wireless signal from the in-vehicle communication device is written, and a field in which the time when the wireless signal from the in-vehicle communication device is received is written. Information written in these fields is held for each of the in-vehicle communication devices 1 to 5 which has transmitted the wireless signal.

In FIG. 4, the location information of the in-vehicle communication device 1 is Position 0, the transmission power setting value is TXP0 and the receiving time of location information is T0. It is supposed that the location information is obtained from the GPS included in the in-vehicle communication device outside connecting part 16. Because the field of the receiving power is a field for writing receiving power of the signal from other in-vehicle communication devices, it is blank for the in-vehicle communication device 1. Further, it may write the direction or the magnitude of speed of the in-vehicle communication device 1 in the field of the location information.

In FIG. 4, the location information of the in-vehicle communication device 2 is Position 1, the transmission power setting value is TXP1 and the receiving time of location information is T1. Because the field of the receiving power is a field for writing the receiving power when the in-vehicle communication device 1 has received the wireless signal from the in-vehicle communication device 2, it is not blank for the in-vehicle communication device 2, but it is RSS1. Further, it may write the direction or the magnitude of speed of the in-vehicle communication device 2 in the field of the location information. Because information to be written in the fields for the in-vehicle communication devices 3 to 5 is similar to the information to be written in the fields for the in-vehicle communication device 2, a description will be omitted.

Further, FIG. 4 shows that the information written in each field for the in-vehicle communication device 5 is to be deleted because a predetermined period has passed (expiration of validity period). Respective circumference vehicle information is held in the in-vehicle controller of each of the in-vehicle communication devices 1 to 5. For example, the circumference vehicle information is stored in a memory (not shown) which is included in the in-vehicle controller.

Figure 5:
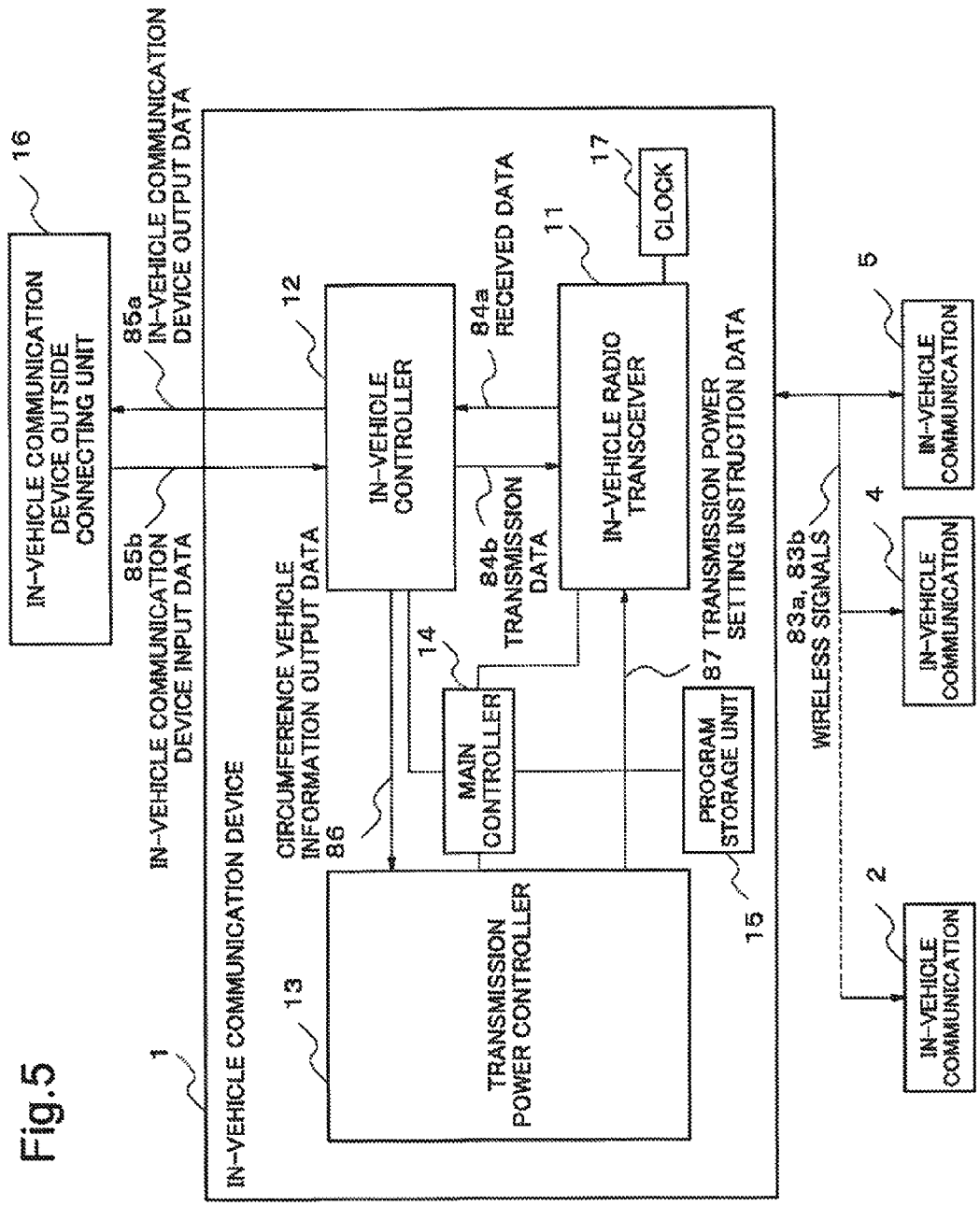
FIG. 5 shows an example of a flow of data in the mobile communication device according to the exemplary embodiment 2 of the present invention.

Next, operation of the in-vehicle communication device 1 will be described in detail with reference to FIGS. 5 and 6. FIG. 5 shows flows of data in the communication system according to the second exemplary embodiment of the present invention. FIG. 6 is a flowchart showing an example of a procedure of the processing in the in-vehicle communication device of the communication system according to the second exemplary embodiment of the present invention. Further, in FIG. 5, the same reference numeral as in FIG. 3 is attached to the same configuration element as in FIG. 3, and a description is omitted.

In FIG. 5, wireless signals 83a, 83b are exchanged between the in-vehicle radio transceiver 11 of the in-vehicle communication device 1 and the in-vehicle communication devices 2 to 5. Also, the received data 84a and the transmission data 84b are exchanged between the in-vehicle radio transceiver 11 and the in-vehicle controller 12. That is, the in-vehicle radio transceiver 11 of the in-vehicle communication device 1 receives the wireless signal 83a from the in-vehicle communication devices 2 to 5, and outputs the received data 84a based on the wireless signal 83a to the in-vehicle controller 12 (Step S201).

Next, in-vehicle communication device input/output data 85a, 85b are exchanged between the in-vehicle controller 12 and the in-vehicle communication device outside connecting part 16. That is, when the received data 84a is inputted from the in-vehicle radio transceiver 11, the in-vehicle controller 12 outputs the in-vehicle communication device output data 85a to the in-vehicle communication device outside connecting part 16, and instructs detection of vehicle information (Step S202). The in-vehicle communication device outside connecting part 16 is controlled by the inputted in-vehicle communication device output data 85a.

Further, the in-vehicle controller 12 generates circumference vehicle information on the in-vehicle communication devices 2 to 5 equipped into surrounding vehicles based on the inputted received data 84a, and holds it in the in-vehicle controller 12. If the generated circumference vehicle information corresponds to information on the in-vehicle communication device of the communication partner which is held in the in-vehicle controller 12, the circumference vehicle information being held is updated, and the circumference vehicle information output data 86 based on the generated circumference vehicle information is outputted to the transmission power controller 13 (Step S203).

The in-vehicle controller 12 monitors the circumference vehicle information held in the in-vehicle controller 12, and if there is information (for example, the information on the in-vehicle communication device 5 in FIG. 4) which is included in the circumference vehicle information and has passed a predetermined period, the in-vehicle controller 12 deletes the information. If the generated circumference vehicle information corresponds to information which was held in the in-vehicle controller 12, but is deleted after having passed the predetermined period (step S211: YES), the in-vehicle controller 12 holds the generated circumference vehicle information, and transmits the circumference vehicle information output data 86 including a notification that the circumference vehicle information has been deleted, to the transmission power controller 13 (Step S210). Also, the in-vehicle communication device 1 may further include a communication partner deleting means (not shown), by which a user deletes the information on the in-vehicle communication device of the communication partner, which is held as the circumference vehicle information. Also, the in-vehicle communication device 1 may further include a communication partner adding means (not shown), which adds an in-vehicle communication device, which can be communicated, but is not held in the circumference vehicle information, to the circumference vehicle information as a communication partner.

The transmission power controller 13 determines the transmission power setting value based on the inputted circumference vehicle information output data 86, and outputs a transmission power setting instruction data 87 to the in-vehicle radio transceiver 11 (Step S204). In a case where the circumference vehicle information output data 86 includes a notification that the in-vehicle controller 12 has deleted the corresponding information, the transmission power controller 13 sets the value of transmission power to a predetermined value of maximum, and transmits the transmission power setting instruction data 87 to the in-vehicle radio transceiver 11 (Step S212).

The in-vehicle controller 12 inputs the in-vehicle communication device input data 85b, which is measured and supplied by the in-vehicle communication device outside connecting part 16, generates information on a vehicle in which the in-vehicle communication device 1 is equipped (for example, information on the in-vehicle communication device 1 in FIG. 4) based on the in-vehicle communication device input data 85b, and outputs the transmission data 84b based on the vehicle information to the in-vehicle radio transceiver 11 (Step S205).

The in-vehicle radio transceiver 11 generates the wireless signal 83b based on the transmission data 84b inputted from the in-vehicle controller 12. Further, the in-vehicle radio transceiver 11 transmits the wireless signal 83b including the vehicle information to the in-vehicle communication devices 2 to 5 with the transmission power of the value that is set by the transmission power setting instruction data 87 inputted from the transmission power controller 13 (Step S206), and the process ends.

If the setting information from the in-vehicle communication device of the communication partner is not updated for a predetermined period, the in-vehicle communication device of the communication partner is regarded having moved and left from the present communication area, and the in-vehicle communication device according to the present invention expands the communication area, and acquires the communication partner's information. In the expanded communication area, the communication partner's information is acquired, and the value of transmission power is set according to the state of the communication partner. As a result, an appropriate transmission power is set corresponding to the situation that the communication device moves.

Next, an example of operation of the transmission power control in the transmission power controller 13 will be described with reference to FIG. 7. Processing of the transmission power control, which will be described below, is a detailed procedure for the processing performed at Step S204, mentioned above in FIG. 6. In the communication system between the cars, for example, the in-vehicle communication device 1 receives the wireless signal from the plurality of in-vehicle communication devices 2 to 5. It is not necessary to say that the number of the other in-vehicle communication devices is not limited to 4. At that time, the receiving power of the wireless signal in the in-vehicle communication device 1 depends on the value of transmission power set in the in-vehicle communication devices 2 to 5. The receiving power further depends on a distance and a state of the propagation path between the in-vehicle communication device 1 and the in-vehicle communication devices 2 to 5.

FIG. 7 shows an example of correlation among the transmission power setting value of the in-vehicle communication device 1, the transmission power setting value of the in-vehicle communication device 2 and the value of receiving power of the wireless signal from the in-vehicle communication device 2 when receiving at the in-vehicle communication device 1. In FIG. 7, each of the transmission power setting values of the in-vehicle communication devices 1, 2 and the receiving power takes three values ("strong" "medium", "weak"). The values of the transmission power and the receiving power are not limited to these three, and may vary continuously.

In FIG. 7, when the transmission power setting value in the in-vehicle communication device 2 is "strong" and the receiving power of the wireless signal received from the in-vehicle communication device 2 at the in-vehicle communication device 1 is "strong", the transmission power setting value in the in-vehicle communication device 1 is "medium". Here, when an interval between the receiving time of a wireless signal from the in-vehicle communication device 2 to the in-vehicle communication device 1 and the transmission time of a wireless signal from the in-vehicle communication device 1 to the in-vehicle communication device 2 is relatively short, the state of the propagation path of the wireless signal at the time of the transmission is assumed to be the same as the state of the propagation path of the wireless signal at the time of the reception.

Referring to FIG. 7, when the transmission power setting value of the in-vehicle communication device 2 which is the communication partner is "strong" and the receiving power of the wireless signal in the in-vehicle communication device 1 is "weak", the transmission power setting value is "strong" in the case of transmitting the wireless signal by return from the in-vehicle communication device 1. At that time, even if the transmission power setting value at the in-vehicle communication device 1 is "strong", the receiving power by the communication partner is expected to be "weak".

On the other hand, when the transmission power setting value at the communication partner is "strong" and the receiving power of the wireless signal at the in-vehicle communication device 1 is "strong", the transmission power setting value is made "medium" in the case of transmitting the wireless signal by return from the in-vehicle communication device 1. This is because even if the transmission power setting value of the wireless signal when the in-vehicle communication device 1 transmits by return is "medium", the receiving power at the communication partner is "medium", and accordingly, the strength of the wireless signal received by the communication partner is expected to be enough.

In FIG. 7, when the receiving power of the wireless signal at the in-vehicle communication device 1 is "medium" and the transmission power setting value at the communication partner is "strong", the transmission power setting value of the wireless signal when the in-vehicle communication device 1 transmits by return is "strong", however, the transmission power setting value when transmitting the wireless signal by return may be changed to "medium" if the wireless signal from the communication partner is received by the receiving power of "medium" stably at the in-vehicle communication device 1.

When the radio communication system includes only two in-vehicle communication devices 1, 2, that is, in the case of one communication partner, the procedure of the transmission power control shown in FIG. 7 may be applied to the in-vehicle communication device 1 just as it is.

On the other hand, when more than two in-vehicle communication devices exchange wireless signals each other within one communication area, the number of in-vehicle communication devices of the communication partner may be limited by controlling the transmission power setting value when the in-vehicle communication device 1 transmits the wireless signal. That is, when there exists an in-vehicle communication device in the communication area with which communication cannot be performed without setting the transmission power setting value to "strong" when the in-vehicle communication device 1 transmits the wireless signal, such an in-vehicle communication device is excluded from the in-vehicle communication device of the communication partner by setting the transmission power setting value to "medium" or "weak". When the number of in-vehicle communication devices of the communication partner is limited, the occurrence of congestion of communication is suppressed, and the decline of the throughput will be reduced. In the control of transmission power of wireless signal in such a communication system, it is necessary to take into account the number of in-vehicle communication devices available for communication, in addition to the correspondence relationship between the transmission power setting value and the receiving power, as shown in FIG. 7, for example.

Further, as shown in FIG. 4, the in-vehicle controller 12 of the in-vehicle communication device 1 holds a time when a wireless signal from the other vehicle communication device is received as the circumference vehicle information. When the time has passed a predetermined period, the information is deleted. At that time, the transmission power controller 13 of the in-vehicle communication device 1 sets the value of transmission power for transmitting the wireless signal to a predetermined value of maximum. For example, the maximum value is "strong" in FIG. 7. As a result, in the environment that the in-vehicle communication device moves, the circumference vehicle information is appropriately updated and stable wireless communication is performed with the transmission power adapted to the fluctuating environment.

As it has been described above, according to the second exemplary embodiment of the present invention, in the wireless communication system in which direct communications are performed among the plurality of in-vehicle communication devices without passing through a base station, the information which is included in the wireless signal received from the surrounding in-vehicle communication device is held, attached with the time when the wireless signal is received. When the receiving time has passed a predetermined period, the information to which the receiving time is attached is deleted. At that time, the value of transmission power of the wireless signal which is transmitted to the in-vehicle communication device, which has sent the received wireless signal, is set to the predetermined value of maximum. As a result, the circumference vehicle information is updated appropriately in the environment where the communication device moves, and stable wireless communication is performed. Also, the number of in-vehicle communication devices of the communication partner within the communication area is limited. As a result, a radio link with the in-vehicle communication device of the communication partner is secured stably. Also, the occurrence of congestion of communication is suppressed, and the decline of the throughput is reduced.

Third Embodiment

Figure 8:
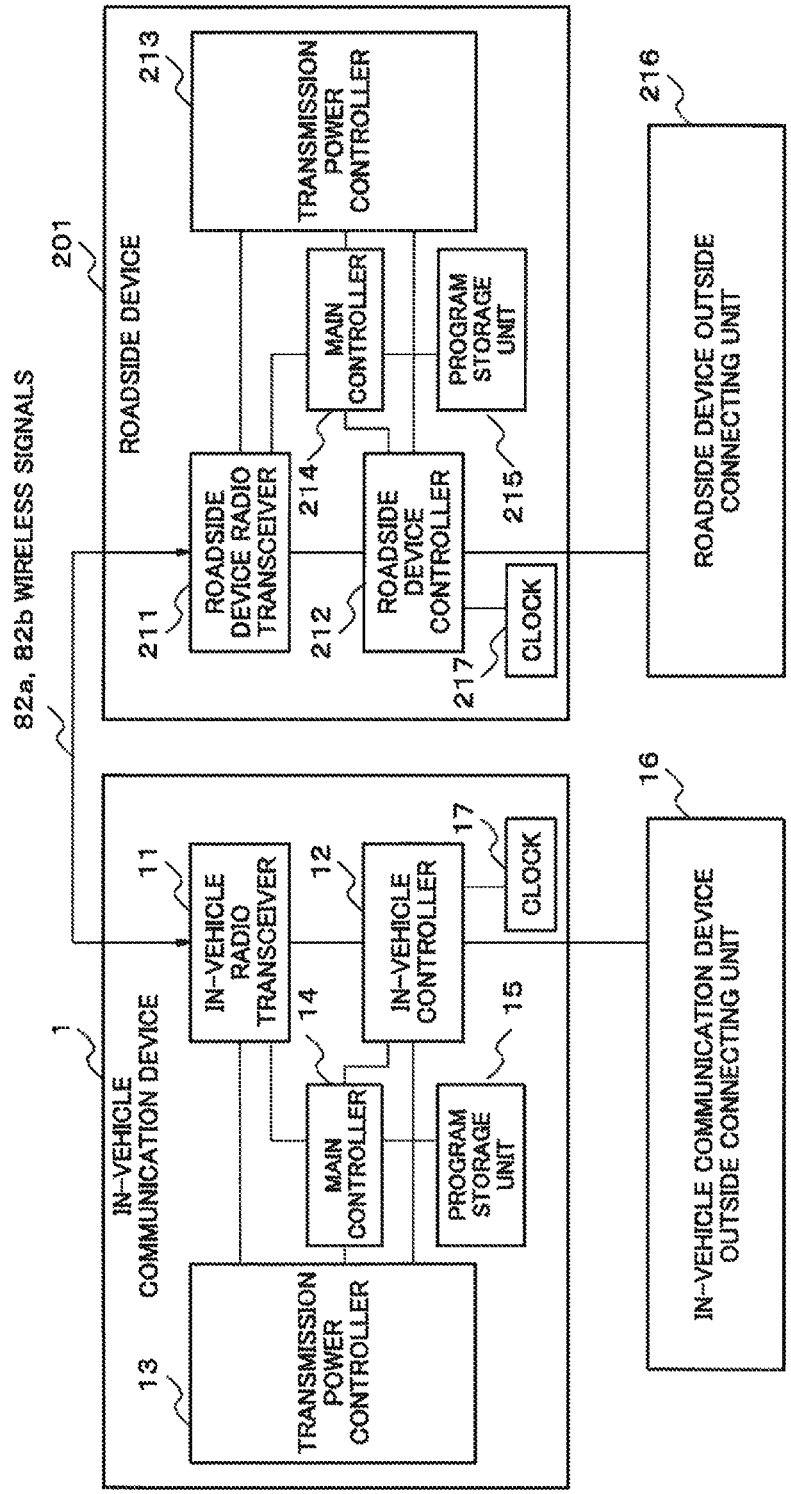
FIG. 8 shows an example of a configuration of a communication system according to an exemplary embodiment 3 of the present invention.

Next, the third exemplary embodiment of the present invention will be described with reference to FIG. 8. FIG. 8 shows an example of a configuration of a communication system including an in-vehicle communication device 1 according to the third exemplary embodiment of the present invention and a roadside device 201 which communicates with the in-vehicle communication device 1. The roadside device 201 has almost the same configuration as the in-vehicle communication device 1 according to the second exemplary embodiment. That is, the roadside device 201 includes a roadside device radio transceiver 211, a roadside device controller 212, a transmission power controller 213, a main controller 214, a program storage part 215 and a clock 217. The roadside device outside connecting part 216 which is connected to the roadside device controller 212 is provided outside the roadside device 201. For example, the roadside device 201 is installed near a pole of roadside and a traffic signal of an intersection or the like. For example, the roadside device outside connecting part 216 of the roadside device 201 detects a vehicle stopping on the road and a pedestrian crossing the road, and transmits information of these to the in-vehicle communication device 1. Also, the roadside device 201 may transmit information or the like of the traffic signal to the in-vehicle communication device 1. The other configuration is the same as the in-vehicle communication device according to the second exemplary embodiment. That is, the roadside device 201 holds circumference vehicle information based on the wireless signal received from the surrounding vehicle communication device, and appropriately sets a value of transmission power when transmitting a wireless signal to the vehicle communication device of the communication partner. Although FIG. 8 shows one roadside device, the number of roadside devices is not limited to 1. Further, it may communicate with a plurality of in-vehicle communication devices of the communication partner.

According to the third exemplary embodiment of the present invention, the in-vehicle communication device 1 acquires the information on the road, such as a pedestrian, a stopping vehicle and a traffic signal, from the roadside device 201, and detects a state of other in-vehicle communication devices by taking into account the information on the road. As a result, when the in-vehicle communication device 1 transmits the wireless signal, the transmission power setting value is controlled with high accuracy. For example, it can judge whether the vehicle equipped with the in-vehicle communication device of the communication partner is in congestion or not according to the number of vehicles stopping on the road. Also, the congested situation of road can be judged whether pedestrians, who are crossing the road, are walking along a pedestrian's crossing following a traffic signal indication. Or, the situation of road can be judged according to the information of the traffic signal indication in the case of the signaling control system which controls traffic congestion on the road by changing a cycle of the traffic signal indication.

Fourth Embodiment

Next, the fourth exemplary embodiment will be described with reference to FIG. 9. FIG. 9 shows an example of a configuration of a communication system of the in-vehicle communication device according to the fourth exemplary embodiment of the present invention.

In FIG. 9, the communication system of the in-vehicle communication device includes the in-vehicle communication devices 1 to 5. Further, the number of in-vehicle communication devices is not limited to 5. Also, a configuration of each of the in-vehicle communication devices 1 to 5 is similar to the in-vehicle communication device 1 or 2 shown in FIG. 3, therefore, the description will be omitted.

In FIG. 9, the in-vehicle communication device 1 and the in-vehicle communication device 2 exist in the communication area 101. The in-vehicle communication device 3 exists in the communication area 102 which includes the communication area 101 and is outside the communication area 101. Further, the in-vehicle communication device 4 exists in the communication area 103 which includes the communication area 102 and is outside the communication area 102. The in-vehicle communication device 5 exists outside the communication area 103. The transmission power setting value takes three values (L (weak), M (medium) and H (Strong)) when the in-vehicle communication devices 1 to 5 transmit a wireless signal. However, the transmission power setting value is not limited to three values, and it may vary continuously.

Further, the distance between the in-vehicle communication devices and the communication areas shown in FIG. 9 may be determined by appropriately taking into account a situation of the road and a degree of congestion of in-vehicle communication devices based on the spatial distance.

In FIG. 9, the in-vehicle communication device 2 exists in the same communication area 101 as the in-vehicle communication device 1, and the distance between the in-vehicle communication device 1 and the in-vehicle communication device 2 is short. For this reason, the transmission power setting value when transmitting the wireless signal exchanged between the in-vehicle communication device 1 and the in-vehicle communication device 2 can take any one of three values of L (weak), M (medium) and H (strong).

The in-vehicle communication device 3 exists in the communication area 102, and the distance between the in-vehicle communication device 1 and the in-vehicle communication device 3 is relatively longer than the distance between the in-vehicle communication device 1 and the in-vehicle communication device 2. For this reason, the transmission power setting value when transmitting the wireless signal exchanged between the in-vehicle communication device 1 and the in-vehicle communication device 3 can take any one of two values of M (medium) and H (strong).

Further, the in-vehicle communication device 4 exists in the communication area 103, and the distance between the in-vehicle communication device 1 and the in-vehicle communication device 4 is longer than the distance between the in-vehicle communication device 1 and the in-vehicle communication device 3. For this reason, when the wireless signal exchanged between the in-vehicle communication device 1 and the in-vehicle communication device 4 is transmitted, the value to be selected as the transmission power setting value is H (strong).

Also, the in-vehicle communication device 5 is outside the communication area 103, and then, the in-vehicle controller excludes the in-vehicle communication device 5 from the in-vehicle communication device of the communication partner with the in-vehicle communication device 1 at the present moment, because it cannot communicate even if the transmission power setting value is set to H (strong).

FIG. 9 shows positions of the in-vehicle communication devices 1 to 5 at a certain time. When the positions of the in-vehicle communication devices 1 to 5 change according to movements of these in-vehicle communication devices 1 to 5, the distances among the in-vehicle communication devices change. For example, the in-vehicle communication device 5, which exists outside the communication area of the in-vehicle communication device 1 at the present moment, may enter the communication area of the in-vehicle communication device 1 at a certain time. Also, any of the in-vehicle communication devices 1 to 4, which exist inside the communication area of the in-vehicle communication device 1 at the present moment, may go out of the range of the communication device of the in-vehicle communication device 1 at a certain time.

When the in-vehicle communication device exists inside the communication area 103 shown in FIG. 9, the communication system according to the fourth exemplary embodiment of the present invention is applied. That is, even if the distance between the in-vehicle communication device 1 and the in-vehicle communication devices 2 to 5 changes, the in-vehicle communication device 1 exchanges the wireless signal with the in-vehicle communication device located inside the communication area 101 shown in FIG. 9 with the transmission power setting value by three values, any of values of L (weak), M (medium) and H (strong), exchanges the wireless signal with the in-vehicle communication device located inside the communication area 102 and outside the communication area 101 with the transmission power setting value by two values, any of values of M (medium) and H (strong), and exchanges the wireless signal with the in-vehicle communication device located inside the communication area 103 and outside the communication area 102 with the transmission power setting value by H (strong).

Further, FIG. 9 shows the communication system including the in-vehicle communication devices 1 to 5, however, it is not limited to this. That is, the communication system according to the fourth exemplary embodiment of the present invention may include a roadside device having similar configuration as the in-vehicle communication devices 1 to 5. It is possible to apply the present invention to the communication between the in-vehicle communication device and the in-vehicle communication device and to the communication between the in-vehicle communication device and the roadside device.

As it has been described above, according to the fourth exemplary embodiment of the present invention, the transmission power of the wireless signal transmitted from the in-vehicle communication device 1 is controlled in response to changes of the distance between the in-vehicle communication device 1 and the in-vehicle communication devices 2 to 5. As a result, the number of in-vehicle communication devices or roadside devices which exist within the communication area is limited, and the radio link with a surrounding communication device is secured stably, and the occurrence of congestion of communication is suppressed, and the decline of the throughput is reduced.

While this invention has been particularly shown and described with reference to exemplary embodiments thereof, the invention is not limited to those specific embodiments. It will be understood by those of ordinary skill in the art that various changes in form and details may be made therein without departing from the spirit and scope of the present invention.

The control operation in the exemplary embodiments mentioned above can be performed using hardware or software, or a configuration which compounds both of them. Further, when performing the processing by using software, it is possible to let a program having recorded the processing sequences execute by installing in a memory in a computer which is incorporated in dedicated hardware. Or, it is possible to let the program execute by installing in a general-purpose computer which can perform various processing. For example, referring to FIG. 3, the in-vehicle communication devices 1, 2 of the present invention are configured by including respective program storage parts 15, 25. The program storage parts 15, 25 store the program of the communication control method shown in FIG. 6. The main controllers ("computer") 14, 24 retrieve the program from the program storage parts 15, 25, and control the in-vehicle radio transceivers 11, 12 and the transmission power controllers 13, 23 according to the program. The program can be recorded in a hard disk or a ROM (Read Only Memory) as a recording medium in advance. Or, the program can be stored (recorded) in a removable recording medium temporarily and or permanently. It is possible to provide such removable recording medium as so-called packaged software. Further, as the removable recording medium, a floppy (registered trademark) disk, CD-ROM (Compact Disc Read Only Memory), an MO (Magneto optical) disk, a DVD (Digital Versatile Disc), a magnetic disk and a semiconductor memory are mentioned. Further, the program is installed in a computer from the removable recording medium mentioned above. Also, it is transferred wirelessly from a download site to a computer. It is also transferred to a computer wiredly via a network.

This application claims priority from Japanese Patent Application No. 2009-050017, filed on Mar. 4, 2009, the contents of which are incorporation herein by reference in their entirety.

INDUSTRIAL APPLICABILITY

The present invention can be used for a mobile communication device and a communication system which perform communication without passing through a base station.

REFERENCE SIGNS LIST 1-5 in-vehicle communication device
11, 21 in-vehicle radio transceiver
12, 22 in-vehicle controller
13, 23, 213 transmission power controller
14, 24, 214 main controller
15, 25, 215 program storage part
16, 26 in-vehicle communication device outside connecting part
17, 27, 217 clock
201 roadside device
211 roadside device radio transceiver
212 roadside device controller
216 roadside device outside connecting part
101-103 communication area

The invention claimed is:

1. A mobile communication device comprising:
a transmitting and receiving unit that receives a first signal transmitted from other mobile communication device;
a control unit that holds first circumference information including transmission power setting information of said first signal, time information including time when said transmitting and receiving unit receives said first signal, and receiving power information of said first signal at said transmitting and receiving unit, and deletes said first circumference information in a case where a predetermined period has passed from said time; and
a transmission power control unit that generates transmission power setting information of a second signal and outputs said transmission power setting information to said transmitting and receiving unit, and provides a predetermined value to said transmission power setting information of the second signal in a case where said first circumference information is deleted.

2. The mobile communication device according to claim 1, wherein said transmission power control unit generates the transmission power setting information of said second signal based on the transmission power setting information and said receiving power information of said first signal.

3. The mobile communication device according to claim 1, wherein if second circumference information, which was held before said transmitting and receiving unit receives said first signal, is held when said transmitting and receiving unit receives said first signal, said control unit updates said second circumference information to said first circumference information, and outputs first notification generated from said first circumference information, and
wherein if said second circumference information has been deleted when said transmitting and receiving unit receives said first signal, said control unit holds said first circumference information, and outputs second notification to said transmission power control unit.

4. The mobile communication device according to claim 3, wherein said second notification is a maximum value set in advance of said predetermined value.

5. The mobile communication device according to claim 1, further comprising a detection unit that detects moving information including at least one of a position, moving speed and moving direction, wherein
said transmitting and receiving unit transmits said second signal including said moving information to said other mobile communication device with transmission power based on the transmission power setting information of said second signal.

6. The mobile communication device according to claim 1, wherein said control unit controls a number of said other mobile communication device.

7. The mobile communication device according to claim 1, wherein
said mobile communication device is an in-vehicle device,
said other mobile communication device is an in-vehicle device or a roadside device, and
said mobile communication device and said other mobile communication device communicate directly.

8. A communication system including first and second communication devices, wherein each of the first and second communication devices comprises:
a transmitting and receiving unit that receives a first signal transmitted from other mobile communication device;
a control unit that holds first circumference information including transmission power setting information of said first signal, time information including time when said transmitting and receiving unit receives said first signal, and receiving power information of said first signal at said transmitting and receiving unit, and deletes said first circumference information in a case where a predetermined period has passed from said time; and a transmission power control unit that generates transmission power setting information of a second signal and outputs said transmission power setting information to said transmitting and receiving unit and provides a predetermined value to said transmission power setting information of the second signal in a case where said first circumference information is deleted.

9. The communication system according to claim 8, wherein said transmission power control unit generates the transmission power setting information of said second signal based on the transmission power setting information of said first signal and said receiving power information.

10. The communication system according to claim 8,
wherein if second circumference information, which was held before said transmitting and receiving unit receives said first signal, is held when said transmitting and receiving unit receives said first signal, said control unit updates said second circumference information to said first circumference information, and outputs first notification generated from said first circumference information, and wherein if said second circumference information has been deleted when said transmitting and receiving unit receives said first signal, said control unit holds said first circumference information, and outputs second notification to said transmission power control unit.

11. The communication system according to claim 8,
wherein said first communication device further comprising a detection unit that detects moving information including at least one of a position, moving speed and moving direction, and wherein said transmitting and receiving unit transmits said second signal including said moving information to said other mobile communication device with transmission power based on the transmission power setting information of said second signal.

12. A communication control method comprising:
a receiving step for receiving a first signal transmitted from other mobile communication device;
a circumference information control step for holding first circumference information including transmission power setting information of said first signal, time information including time when said first signal is received, and receiving power information of said first signal, and deleting said first circumference information in a case where a predetermined period has passed from said time;
a transmission power setting step for generating transmission power setting information of a second signal, and providing a predetermined value to said transmission power setting information of the second signal in a case where said first circumference information is deleted; and
a transmission step for transmitting said second signal with transmission power based on said transmission power setting information.

13. The communication control method according to claim 12, wherein said transmission power setting step generates the transmission power setting information of said second signal based on the transmission power setting information of said first signal and said receiving power information.

14. The communication control method according to claim 12, wherein said circumference information control step includes,
a step for, if second circumference information, which was held before receiving said first signal, is held when said first signal is received, updating said second circumference information to said first circumference information, and for outputting first notification generated from said first circumference information, and a step for, if said second circumference information has been deleted when said first signal is received, holding said first circumference information, and for outputting second notification to said transmission power control means.

15. The communication control method according to claim 12, further comprising a detection step for detecting moving information including at least one of a position, moving speed and moving direction, wherein said transmission step transmits said second signal including said moving information to said other mobile communication device with transmission power based on the transmission power setting information of said second signal.

16. A communication control program for causing a computer to execute a control process comprising:
a receiving step for receiving a first signal transmitted from other mobile communication device;
a circumference information control step for holding first circumference information including transmission power setting information of said first signal, time information including time when said first signal is received, and receiving power information of said first signal, and deleting said first circumference information in a case where a predetermined period has passed from said time;
a transmission power setting step for generating transmission power setting information of a second signal, and providing a predetermined value to said transmission power setting information of the second signal in a case where said first circumference information is deleted; and
a transmission step for transmitting said second signal with transmission power based on said transmission power setting information.

17. A mobile communication device comprising:
transmitting and receiving means for receiving a first signal transmitted from other mobile communication device;
control means for holding first circumference information including transmission power setting information of said first signal, time information including time when said transmitting and receiving means receives said first signal, and receiving power information of said first signal at said transmitting and receiving means, and deleting said first circumference information in a case where a predetermined period has passed from said time; and
transmission power control means for generating transmission power setting information of a second signal and outputting to said transmitting and receiving means, and providing a predetermined value to said transmission power setting information of the second signal in a case where said first circumference information is deleted.

18. The mobile communication device according to claim 17, wherein said transmission power control means generates the transmission power setting information of said second signal based on the transmission power setting information and said receiving power information of said first signal.

19. The mobile communication device according to claim 17,
  wherein if second circumference information, which was held before said transmitting and receiving means receives said first signal, is held when said transmitting and receiving means receives said first signal, said control means updates said second circumference information to said first circumference information, and outputs first notification generated from said first circumference information, and
  wherein if said second circumference information has been deleted when said transmitting and receiving means receives said first signal, said control means holds said first circumference information, and outputs second notification to said transmission power control means.

20. The mobile communication device according to claim 17, further comprising detection means for detecting moving information including at least one of a position, moving speed and moving direction, wherein
  said transmitting and receiving means transmits said second signal including said moving information to said other mobile communication device with transmission power based on the transmission power setting information of said second signal.

* * * * *